INVENTOR.
ARTHUR G. SCHRAMM
BY Scott L. Nowiel

Oct. 1, 1963 — A. G. SCHRAMM — 3,105,704
STEERABLE DOLLY

Filed May 17, 1962 — 2 Sheets-Sheet 2

INVENTOR.
ARTHUR G. SCHRAMM
BY Scott L. Norvicl
ATTY.

3,105,704
STEERABLE DOLLY
Arthur G. Schramm, 215 N. 28th St., Phoenix 34, Ariz.
Filed May 17, 1962, Ser. No. 195,490
5 Claims. (Cl. 280—443)

This invention concerns steerable dollies for trailers or the like.

The dolly here concerned is a two wheel type and the wheels are coupled to turn together, similar to automobiles. The dolly has a tongue extending ahead of its front end for attachment to the towing vehicle and includes mechanism for operating the wheels to steer right and left as may be required.

One of the objects of the invention is to provide a dolly of the type above mentioned which has means coupled to the tractor for steering the wheels automatically as the towing vehicle and the towed vehicle turn during the course of movement.

Another object of the invention is to provide a steerable dolly wherein the wheels are sprung to absorb road shocks, and wherein the angle that the tongue bears to the level of the bed of the trailer may be varied so that the front end of the towed vehicle may be lowered or raised as desired.

Still another object is to provide a dolly having mechanical means for raising and lowering the dolly wheels with reference to the dolly body so that the body may be raised and lowered to keep it level.

Still another object is to provide a latch for the hydraulic raising and lowering mechanism to take the strain of road shocks from the hydraulic mechanism.

Still another object is to provide a strain mechanism for operating the latch so that it will resiliently stay in either of two positions, latched or unlatched.

Still another object is to provide a linkage means connecting the dolly axle to the pulling tongue so that the dolly axle is pivotally connected to the main vehicle frame and said pulling tongue is pivotally connected to the main vehicle frame, whereby a fixed ratio of vehicle load weight will be applied to the dolly wheels and a fixed ratio of the vehicle load weight will be applied to pulling vehicle hitch.

Another object is to provide an adjustment within the linkage of the device to change the weight ratios applied to the dolly wheels and to the pulling tongue at the hitch point.

Still another object is to provide a compensating means so the fixed load weight on the dolly wheels and the fixed load weight on the dolly pulling tongue at the hitch point will always be the same while traveling over uneven terrain.

Still another object is to provide a holding bar to hold the dolly wheels in running position so that the hydraulic mechanism can be released when disconnecting the dolly from the pulling vehicle.

Other objects will appear hereinafter.

I attain the foregoing objects by means of the devices, parts and combinations of parts shown in the accompanying drawings, in which.

Similar numerals refer to similar parts in the several views.

Figure 1:
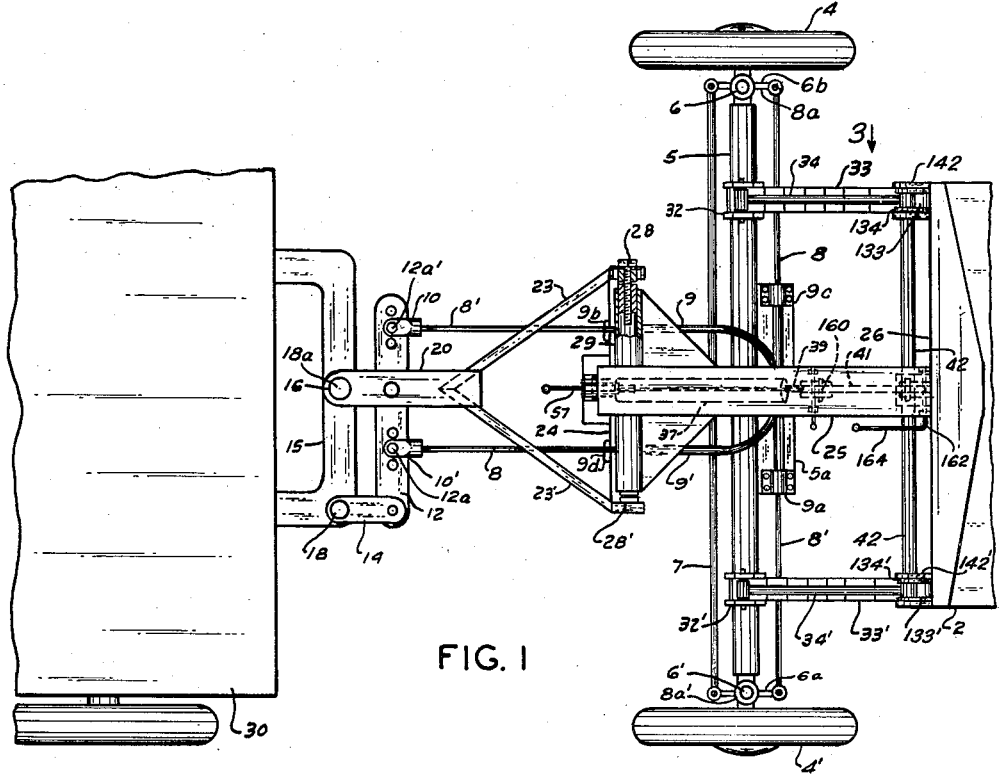
FIGURE 1 is a plan view of the steering dolly as applied to a trailer and as coupled to the rear end of a towing vehicle.
Figure 2:
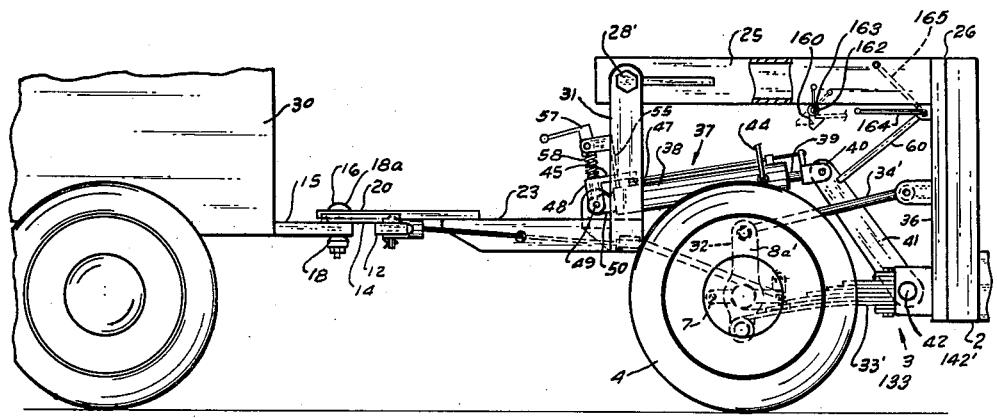
FIGURE 2 is a side elevational view of the mechanism shown in FIGURE 1 in raised or running position.
Figure 3:
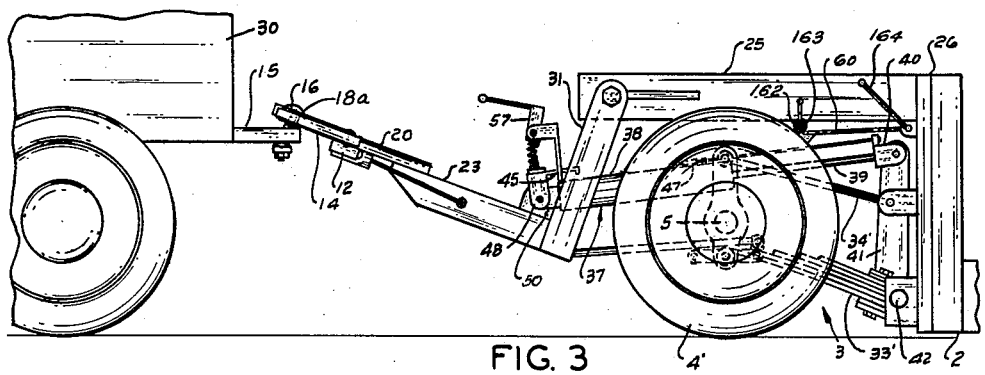
FIGURE 3 is a side elevational view of the device, as shown in FIGURE 1 in a lowered position as when the trailer is being loaded.
Figure 4:
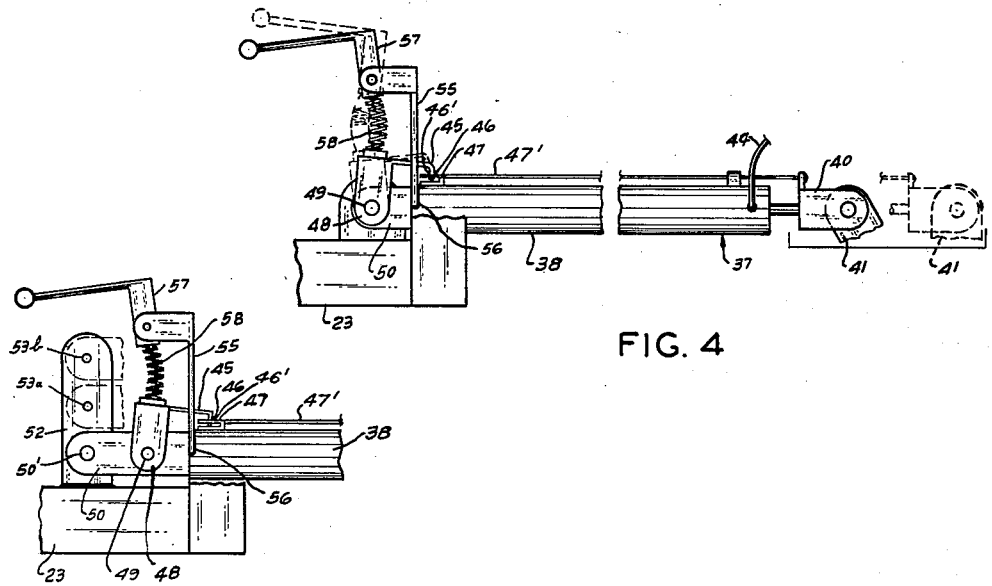
FIGURE 4 is a side elevational view of the hydraulic raising and lowering mechanism, drawn on an enlarged scale.

In the device as shown in FIGURES 1, 2 and 3, 2 indicates the front end portion of a trailer body, and 3 is the dolly which is attached thereto. 4 and 4' indicate running wheels on the dolly which are supported on a shaft or axle 5 by king pins 6 and 6' in a manner similar to that used in automobile structure. The wheels are joined by a tie rod 7 and are operated by pull cables 8 and 8'. These cables extend through guide tubes 9 and 9' to keep their shape and direction and terminate in clevises 10 and 10'. Cable 8 goes through tube 9' and connects steering knuckle 8a' with clevis 10' which is pivotally attached to bar 12 by pin 12a which passes through mating holes in the clevis and holes in the bar. Cable 8' passes through tube 9 and connects clevis 10 with the arm 6a of knuckle joint 8a, by which wheel 4' is supported. Tube 9 is supported at its rear end by clamp 9a on plate 5a, which is welded to axle 5 and extends rearwardly therefrom. This tube is supported at its forward end by a similar clamp 9b on the bottom face of bar 24. Tube 9' is similarly supported on plate 5a and bar 24 by clamp 9c and a left-hand counter part 9d of clamp 9b. These supporting means are used to hold tubes 9 and 9' in crossed relation. The clevises are, in turn, attached to a steering bar 12 by pins 12a and 12a'. The steering bar is operated through a link 14 attached by a ball and socket joint 18a to the truck rear bumper 15 in a manner to be eccentric to the pivotal main ball and socket joint 16 and which is of the type commonly used to couple trailers to towing vehicles. A similar ball and socket joint is used to attach link 14 to rear bumper 15.

The tow bar or pulling tongue 20 is attached by braces 23 and 23' to a rigid cross piece 24 which has vertical risers 31 at its lateral ends. The draw bar tongue 25 extends forward from the front end 26 of the trailer body 2. Suitable pivot screws 28 and 28' are provided in the ends of cross bar 29, to attach the front end of the tongue to the forward portion of the hitch. This includes the draw bar 20 and the braces 23 and 23'. The point of pivot of bolts 28 and 28' is above the level of the braces 23 and 23'.

The bolt brackets 32 are supported at the bottom by semi-elliptical springs 33 and 33' and at the top by radius bars 34 and 34'. King pins 6 and 6', and steering knuckles 8a and 8a' are supported on dolly 3 by leaf springs 33 and 33' at the bottom, and by radius rods 34 and 34' at their tops. The rear ends of springs 33 and 33' are each attached by butt clamps 133 and 133' to transverse shaft 42, and at their forward ends by brackets 32 and 32' to the bottom portions of steering knuckles 8a and 8a'.

Radius bars, or rods, 34 and 34', which are of substantially the same length as the springs, are pivotally attached to portions of the front end 26 of the trailer body 2 at their rear ends by U-shaped clevises 134 and 134', and are pivotally attached at their forward ends to the upper portions of steering knuckles 8a and 8a'.

Shaft 42 is journalled at its ends in brackets 142 and 142' which are welded to the vertical front end 26 of trailer body 2.

The springs 33 and 33' extend forward from end 26 of the trailer body 2 in separated and parallel relation to each other and maintain pins 6 and 6' of knuckles 8a and 8a' in a substantially vertical position throughout flexing movement of the springs. Thus, the king pins 6 and 6' may move upwardly and downwardly while maintained vertical and front end portion 26 of the trailer body 2.

In order to move the towing attachment assembly, including the braces 23, upwardly and downwardly with reference to the ground, I provide the hydraulic mechanism generally indicated by numeral 37. This mechanism includes the hydraulic cylinder 38 in which a piston is attached to piston rod 39. The piston rod is, in turn, attached to a lever 41 which is, in turn, pivotally attached to shaft 42 journalled on the front end 26 of the trailer. The piston in the cylinder 38 is operated by fluid under hydraulic pressure furnished through the tube 44.

In order to lock the piston rod clevis 40 at a position with the piston rod fully contracted such as shown in FIGURE 2, I provide a latch body 45 which has a pin 46' that engages in a hole 46 in the flat thin clevis 47 welded on the end of sliding latch rod 47'. The latch 45 is supported on a pivotally mounted clevis 48. The pivot pin 49, which holds this clevis, extends through the forward extension 50 of the closed head of cylinder 38. Extension 50 is, in turn, pivotally attached to tongue 25. In the modified form, shown in FIGURE 5, the upwardly extending bar 52 may have several adjustment positions provided by various holes, such as 53a and 53b.

Figure 5:
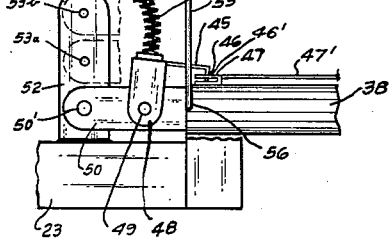
FIGURE 5 is a side elevtional view of a modified form of latch mechanism showing an optional form of load dividing means.

A bracket 55 extends upward from the forward end of cylinder 38 and pivotally mounts the latch operating lever 57. This lever is operationally connected to the latch supported clevis 48 by the strain spring 58. This spring forms a fore and aft connecting means between the operating lever 57 and the clevis pin 49 and at the same time is resilient and positioned so that when the clevis goes over dead center it will stay in either the fore or aft latched position. As shown in FIGURE 5, the parts are shown in latched position.

In use, the trailer is brought up toward the rear of the towing vehicle 30 so that the ball joint can be attached to the towing bar 15. After this the link 14 is attached to ball joint 18 eccentrically disposed on bar 15. Thereafter, the wheels 4 and 4' of the dolly are adjusted as to height so that pulling on the tongue assembly, including the braces 23, pull in a straight line. This is done by operating the hydraulic mechanism 37 and then latching it in the desired position with the wheels lowered or raised relative to the trailer body to assure a level operation. Towing then proceeds in the usual manner.

When it is necessary to uncouple the ball joint 16 and remove the towing vehicle and in this way remove the support of the bar 12 from the support of the bar 15 I provide a brace 60 which can be pivoted to a lowered position to engage the upper end portion of the crank lever 41. To hold brace 60 in position raised and away from contact with crank lever 41, I provide a latch hook 160 which is pivotally attached to draw bar tongue 25 by a transverse shaft portion 162 which extends through bearing 163. A handle 164 enables the user to rotate shaft 162 and engage hook 160 on handle 164. This movement is from the designated position indicated by dotted lines 165 (FIGURE 2) to the engaging position shown by solid lines 164. The brace bar, per se, is moved from the position (60) while in the engaging position to the raised or disengaged position by the handle 164, which is angularly positioned relative to brace bar 60 to place the handle in a convenient position. When the brace bar 60 is raised and held by latch hook 160, the crank lever 41 is free to move by the urge of piston rod 39. In this way the wheels 4—4' can be held in lowered running or transport position while draw bar 20 is disconnected from the pulling vehicle 30.

The structure above described will permit the springs 33 and 33' to be pivoted at their butt ends on shaft 42 thus the axle 5 can be raised or lowered with reference to the ground. This is done by operating the ram 38 and piston rod 39. This, in turn, operates the crank lever 41 and rotates the shaft 42. As the axle 5 is raised and lowered the steering knuckle and king pins 6 and 6' remain substantially vertical due to the action of the radius bars 34 and 34'. The results of this operation are shown in FIGURE 2 which shows the trailer body 2 in raised position and in FIGURE 3 which shows the trailer body in lowered position substantially resting on the ground, if desired.

When in the raised position, it is desirable that the vibration of running is not on the oil in the ram cylinder 38. To hold the ram piston in place, I provide a ram latch consisting of the latch bar 45, which has a pin 46 at its front end adapted to enter a hole in the clevis 47 and which will hold the piston rod clevis 40 in a definite position. The latch bar 45 is held on the pivotally mounted clevis 48. This is pivoted on the pin 49, as above mentioned, and is supported on the rear cylinder extension 50. The latching and unlatching is controlled by the hand lever 57 which carries the strain spring 58 to control the position of the latch clevis 48. The position of control lever 57 by which the strain is applied to the clevis 48 shifts whenever the manual movement of 57 goes over dead center from the forward side to the rear side and vice versa.

When the wheels 4 on axle 5 are lowered relative to body 2, the device is said to be in operative position and may be towed by the truck or other tractive vehicle 30. In towing it is to be noted that the coupling link 14 operates the pivoted bar 12 and this bar, in turn, controls the steering position of wheels 4 and 4' in a manner well understood to the art.

Referring to FIGURE 5, note that the position of the bracket 50 can be changed relative to the vertical piece 52 by removing the pin 50' from the position shown in FIGURE 5, raising the part 50 and reinserting the pin in either hole 53a or 53b. This changes the position and leverage of the cylinder 38 with reference to the crank arm 41.

I claim:

1. A steerable dolly for trailers having a body with a tongue extending forward from the front end of said body, a transverse axle disposed forward of the front end of said body, wheels on the ends of said axle attached by knuckle joints including vertical king pins, means for attaching said axle to said body including spring attachment fittings secured to said axle at point equi-distant from the center thereof, leaf springs attached at their forward ends to said fittings, a transverse shaft journalled in the front end of said trailer body, said springs being attached to said shaft at their butt ends, radius rods attached to said attachment fittings at points above said springs and extending rearwardly substantially parallel to said springs and pivotally attached to the said body at their rear ends, a pulling tongue at the forward end of said body having a socket for ball point attachment to a truck, a riser at the rear end of said pulling tongue pivotally attached to the front end of said trailer body tongue, a crank attached to the mid-portion of said spring supporting shaft, a hydraulic ram having a cylinder and piston operatively connected between the end of said lever and said tongue; a truck having a towing bar, a steering bar pivotally attached to the fore part of said tongue having an eccentrically positioned attachment to said truck towing bar, and cables connecting the ends of said steering bar to said wheels to effect steering; together with mechanism for controlling said hydraulic ram to operate the lever connected therewith to raise and lower said springs.

2. A steerable dolly for trailers having a body with a forwardly extending tongue, comprising a transverse axle disposed forward of the front end of said body, steerable wheels on the ends of said axle, transversely separated spring attachment fittings secured to said axle, leaf springs attached at their forward ends to said fittings, a transverse spring supporting shaft journalled on the front end of said trailer body, said springs being attached to said shaft at their butt ends, reach rods attached to said fittings at points above the attachment points of said springs, and pivotally attached to said body at their rear ends, a pulling tongue at the forward end of said body having a socket and ball joint for attachment to a truck rear bumper, a riser at the rear end of said pulling tongue extending upwardly therefrom and pivotally attached at its top end to the front end of said trailer body tongue, a crank attached to the mid-portion of said spring supporting shaft, a hydraulic ram mechanism having a cylinder and piston operatively connected between the end of said lever and said tongue, means for injecting oil under pressure into said cylinder to lower the front ends of said springs and thereby raise said body, and mechanical latching means for positioning and holding said piston in said cylinder in a retracted position independently of oil pressure in said cylinder.

3. For a trailer having a body, a steerable dolly having a frame, a pulling tongue extending forward from the front end of said frame, a transverse axle disposed on the front end of said frame, steering wheels on the ends of said axle, means for attaching said axle to said dolly, including leaf springs attached at their forward ends to said axle, a transverse shaft journalled in the front end of said trailer body, said springs being attached to said shaft at their rear butt ends, said frame having a socket ball joint at the front end of said tongue, for attachment to a truck, a crank attached to the mid-portion of said spring supporting transverse shaft, a hydraulic ram having a cylinder pivotally attached to said tongue and a piston operatively connected between the end of the lever on said shaft; control means including strain springs having stop positions on each side of a dead center position to control a latch operative on said cylinder and piston, a latch operatively connected between said cylinder and piston to position the piston in said cylinder and hold it in retracted position independently of oil pressure in said cylinder, and means for steering said dolly wheels by the turning movement of said truck when in operation.

4. A dolly for trailers having a body with a forwardly extending tongue, comprising a transverse axle disposed forward on the front end of said body, wheels on the ends of said axle, transversely separated spring attachment fittings secured to said axle, leaf springs attached at their forward ends to said fittings, a transverse spring supporting shaft journalled in the front end of said trailer body, said springs being attached to said shaft at their butt ends, reach rods attached to said fittings at points above the attachment points of said springs, and pivotally attached to said body at their rear ends, a pulling tongue at the forward end of said body having a socket and ball joint for attachment to a truck towing bar, a riser at the rear end of said pulling tongue extending upwardly therefrom and pivotally attached at its top end to the front end of said trailer body tongue, a crank attached to the mid-portion of said spring supporting shaft, a hydraulic ram mechanism having a cylinder and piston operatively connected between the end of said lever and said tongue, means for injecting oil under pressure into said cylinder to lower the front ends of said springs and thereby raise said body, and mechanical latching means for positioning and holding said piston and cylinder in desired relative positions independently of oil pressure in said cylinder.

5. A dolly for trailers having a body with a forwardly extending tongue, comprising a transverse axle disposed forward on the front end of said body, wheels on the ends of said axle, transversely separated spring attachment fittings secured to said axle, leaf springs attached at their forward ends to said fittings, a transverse spring supporting shaft journalled in the front end of said trailer body, said springs being attached to said shaft at their butt ends, reach rods attached to said fittings at points above the attachment points of said springs, and pivotally attached to said body at their rear ends, a pulling tongue at the forward end of said body having a socket and ball joint for attachment to a truck rear bumper, a riser at the rear end of said pulling tongue extending upwardly therefrom and pivotally attached at its top end to the front end of said trailer body tongue, a crank attached to the mid-portion of said spring supporting shaft, a hydraulic ram mechanism having a cylinder and piston operatively connected between the end of said lever and said tongue, means for injecting oil under pressure into said cylinder to lower the front ends of said springs and thereby raise said body, and mechanical latching means for positioning and holding said piston and cylinder in desired relative positions independently of oil pressure in said cylinder, and a holding bar pivotally mounted on said frame and disposed so that it may be moved to a holding position engaged against the top portion of the lever on said spring shaft whereby said hydraulic mechanism may be removed or adjusted and said hitch may be removed from the pulling vehicle; said holding bar, holding the pulling tongue in elevated position independently of said hydraulic mechanism.

References Cited in the file of this patent

UNITED STATES PATENTS

| | | |
|---|---|---|
| 2,410,241 | Schramm | Oct. 29, 1946 |
| 2,452,267 | Schramm | Oct. 26, 1948 |
| 2,458,666 | Williams | Jan. 11, 1949 |
| 2,621,036 | Rother | Dec. 9, 1952 |
| 2,704,021 | Brundage | Mar. 15, 1955 |

FOREIGN PATENTS

| | | |
|---|---|---|
| 1,203,679 | France | Aug. 3, 1959 |